June 17, 1941.  F. D. SLOUGH ET AL  2,245,615
ELECTRIC TYPEWRITER
Filed May 4, 1939  5 Sheets-Sheet 1
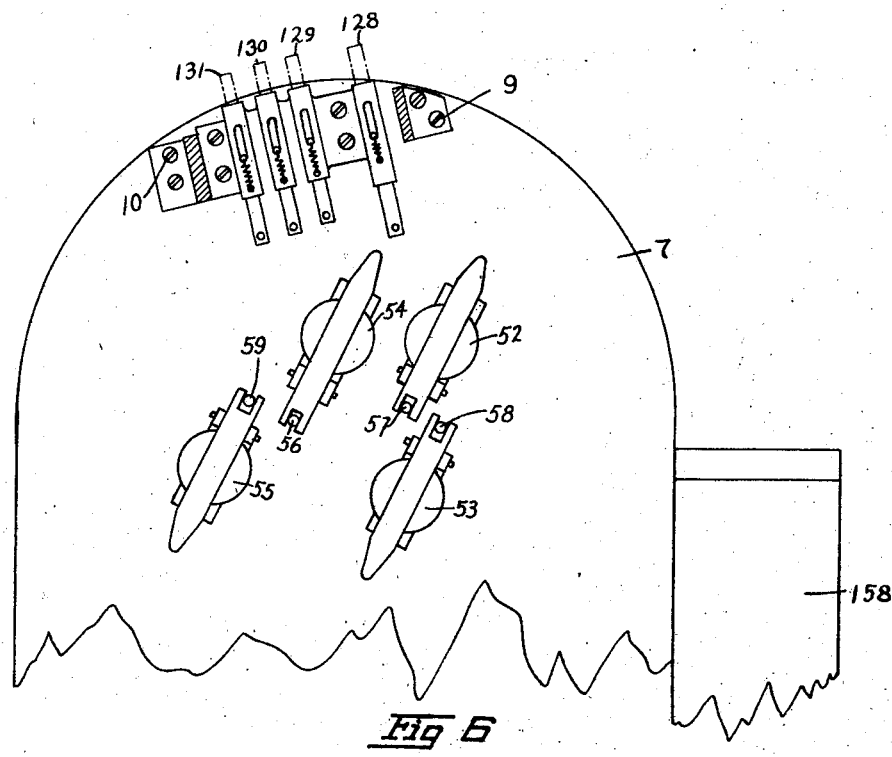
Fig 6
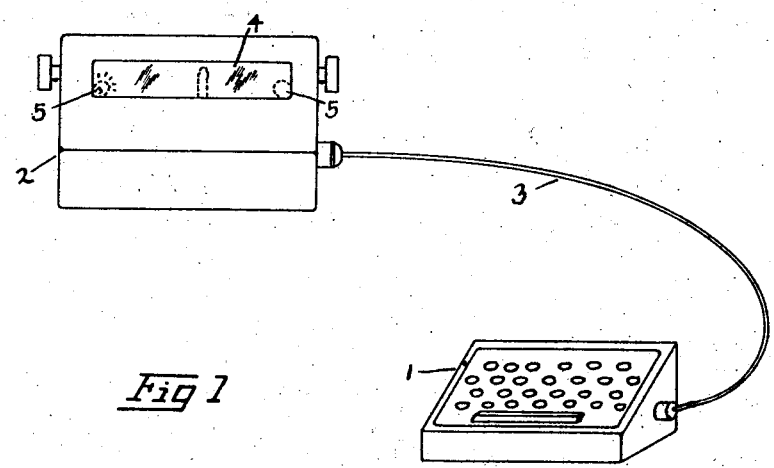
Fig 1
INVENTORS
FRANK D. SLOUGH
BY CAPEL W MCNASH
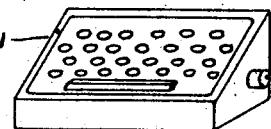
ATTORNEY.

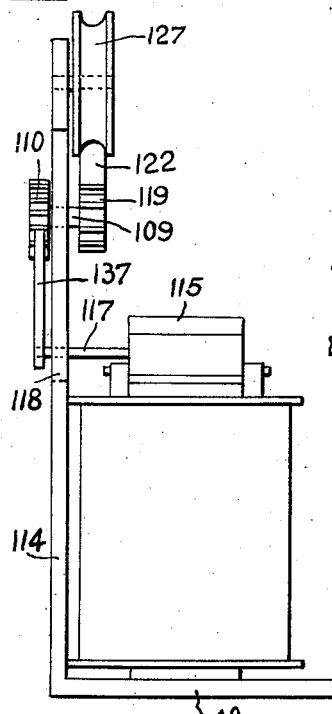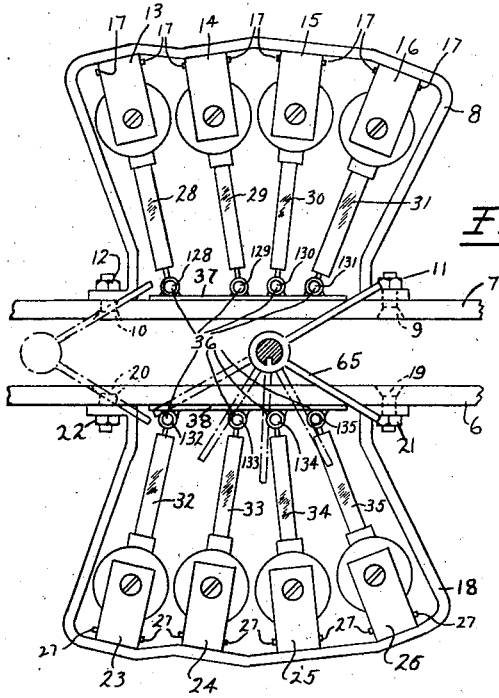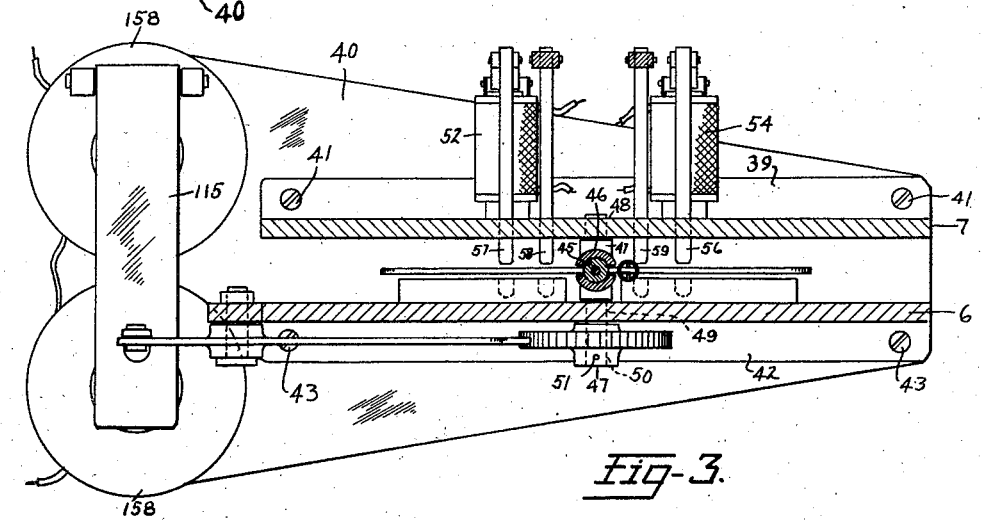

June 17, 1941.  F. D. SLOUGH ET AL  2,245,615
ELECTRIC TYPEWRITER
Filed May 4, 1939   5 Sheets-Sheet 3

INVENTORS
FRANK D. SLOUGH
CAPEL W. McNASH
BY
ATTORNEY.

June 17, 1941.  F. D. SLOUGH ET AL  2,245,615
ELECTRIC TYPEWRITER
Filed May 4, 1939  5 Sheets-Sheet 4

INVENTORS
FRANK D. SLOUGH
CAPEL W. McNASH
BY George M. Soule
ATTORNEY.

Patented June 17, 1941

2,245,615

UNITED STATES PATENT OFFICE 2,245,615

ELECTRIC TYPEWRITER

Frank D. Slough, Cleveland, and Capel W. McNash, Lakewood, Ohio; said Slough assignor to Henry B. Henson Application May 4, 1939, Serial No. 271,726

16 Claims. (Cl. 197—12)

This invention relates to improvements in typewriting machines of the class in which the character dies to be impressed on the work are mounted on a common support, which is rotatively and/or axially adjustable for character selection; in other words, of the type-wheel class.

The objects include improvements in typewriting machines, particularly of the class mentioned above, in respect to speed and uniformity of operation; reduction of inertia and bulk of moving parts; simplicity and economy of construction; greater adaptability to different fields of use; reduction of errors incident to muscular fatigue (when arranged for manual operation, as with a keyboard); reduction and simplification of wiring required (when arranged for electrical operation, and more particularly when arranged for remote control, as in operating batteries of units from a common keyboard or master controller), and in other respects, as will become apparent from the description and drawings.

A specific object is to provide a typewriting machine of the type-wheel class in which the effective inertia of the type wheel is greatly reduced without sacrifice of the number of characters in the font.

Another specific object is to provide an improved control circuit for a typewriter in which the physical work is accomplished for the most part, by electromagnetic means.

A still further specific object is to provide a typewriting machine in which type selection and impact of selected type on the work are accomplished by power and more economically and effectively than said operations can be accomplished by prior machines.

The drawings show but one form of the invention; but applicability of the principles thereof to other forms will be apparent.

Figure 4:
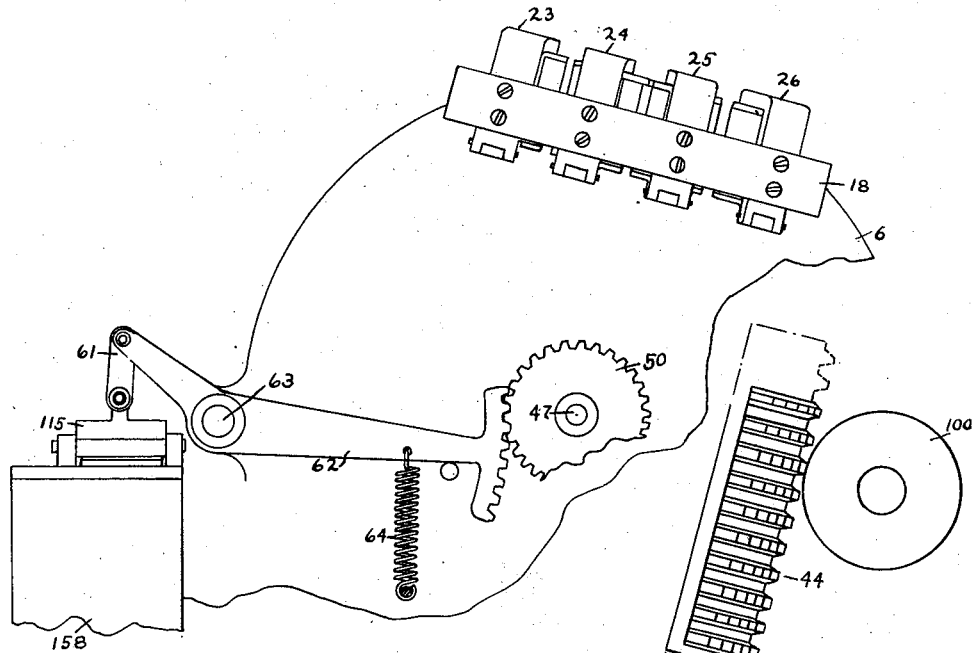
Figure 5:
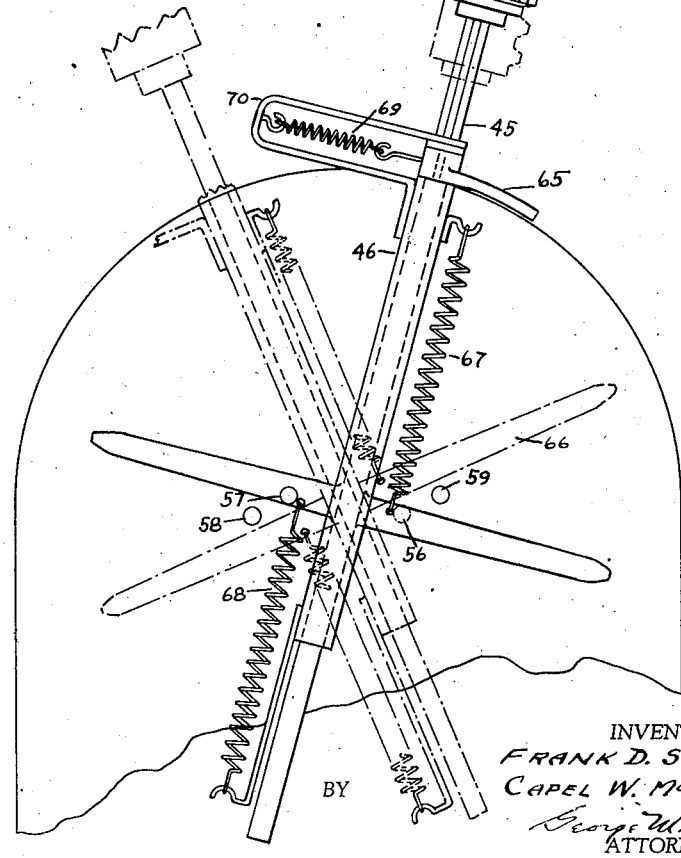
Figure 7:
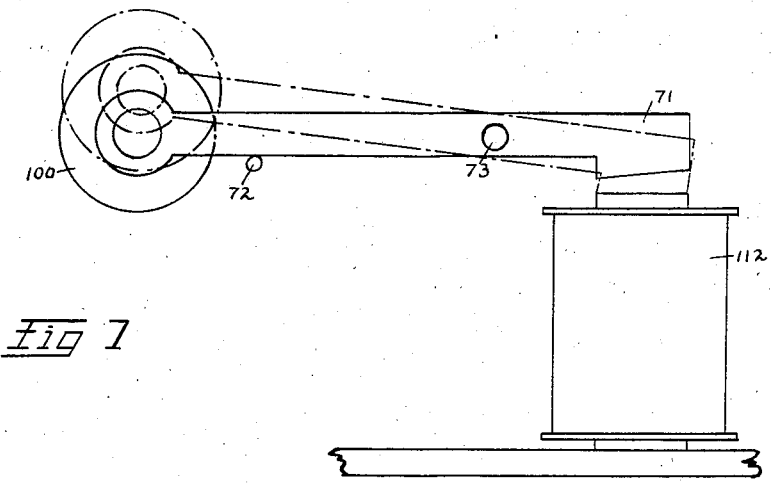
Figure 8:
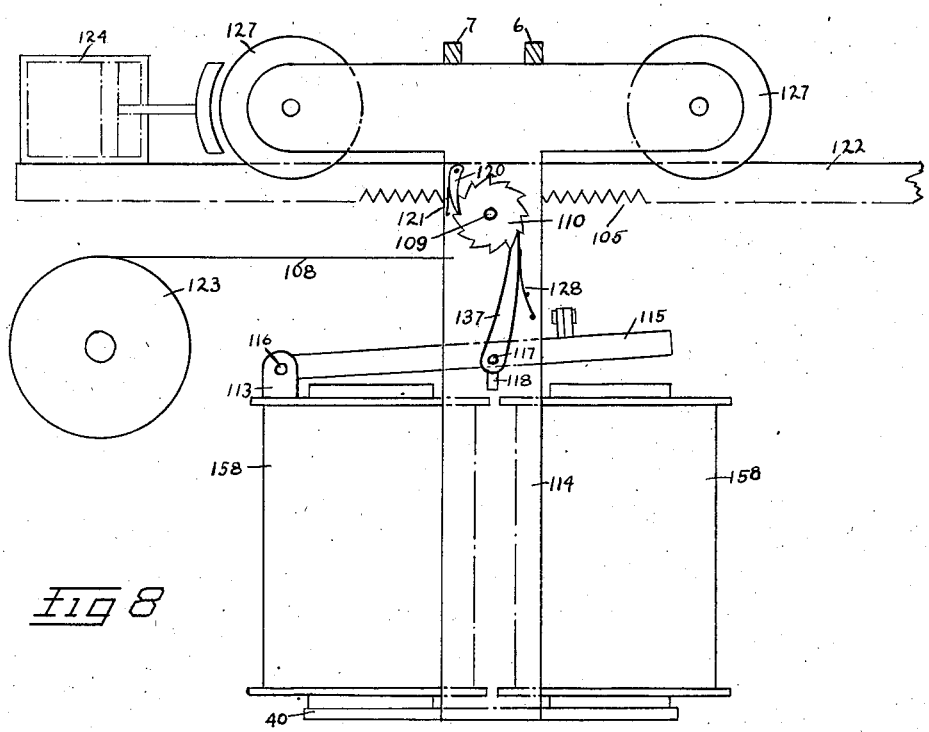
Figure 9:
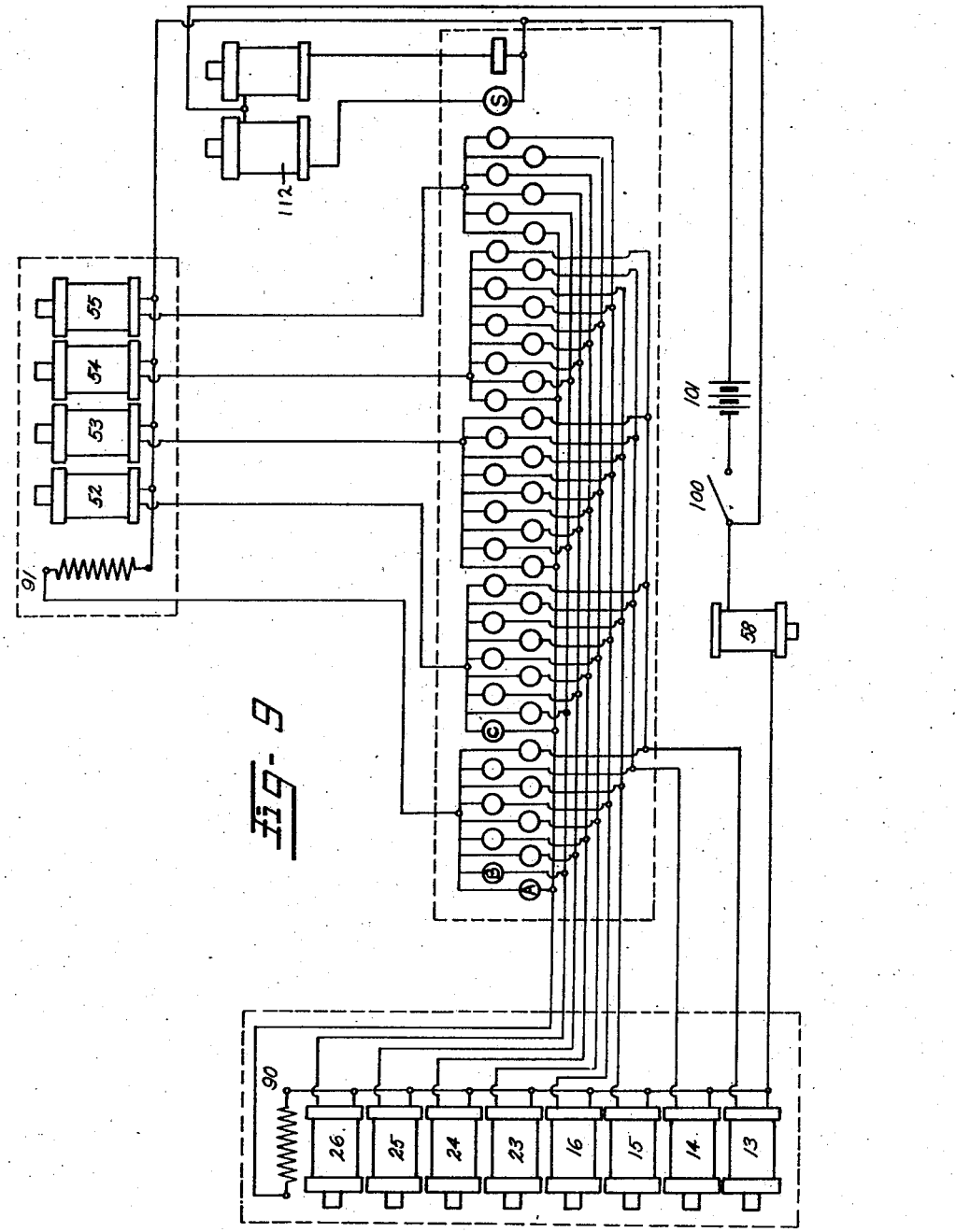

In the drawings, Fig. 1 is a plan view of the typewriting mechanism and a perspective view of a keyboard, the latter being shown as separate from said mechanism and connected therewith by an electrical conductor cord or cable; Fig. 2 is a fragmentary plan view of a type selecting mechanism and apparatus arranged for rotary or indexing movement of the type wheel; Fig. 3 is a fragmentary plan view, showing a mechanism and apparatus for accomplishing axial selective movement of the type wheel and other apparatus and mechanism for moving the positioned type characters or dies against the work, upper portions of the frame and parts carried thereby being broken away; Fig. 4 is a fragmentary side elevation of the mechanism and apparatus of Figs. 2 and 3; Fig. 5 is a partially diagrammatic assembly view showing the type wheel, work support, mounting means for the wheel and (partially) the means for accomplishing axial and rotary adjustment of the wheel; Fig. 6 is a view similar to Fig. 4, but from an opposite direction, showing further details of electrical apparatus employed for type selection in respect to the wheel; Fig. 7 is a side elevation of a mechanism and electrical apparatus for adjusting the work support or platen as part of the type selection operation; Fig. 8 is a partially diagrammatic end elevation of a letter-feed mechanism and apparatus which, in the form shown, advances the type wheel and its positioning means step-by-step across the work; Fig. 9 is an electrical diagram showing the control of the various electrical instrumentalities as by a keyboard adapted to constitute a multiple electrical switch board; Fig. 10 is a side view of the letter-feed mechanism of Fig. 8.

Fig. 1 shows the keyboard 1, a frame or case 2, for the typing machinery and work, and an electrical cord or cable 3 connecting the keyboard and the electrical apparatus in the case. The keyboard could, of course, be on the case. The case can fully enclose the typing machinery and electrical apparatus and be provided with a transparent window 4 through which the progress of the work may be observed as illuminated by lights 5 conveniently arranged in or on the case.

For clarity and in view of the fact that the machinery and apparatus of the type or class to which this invention relates are well known to those skilled in the art, only the principal characteristics and interrelationships of the mechanisms and apparatus are attempted to be illustrated; and portions of the frame work and various refinements are omitted, in order to enable clearer illustration of the parts which are considered essential to the present embodiment.

In Figs. 2, 3 and 6 spaced upright parallel walls 6 and 7 and a base member 40 indicate suitable rigid framework for a transcribing unit, which includes the type wheel 44 (Fig. 5), its mounting means on the framework, and electrical selector sets which cooperate with the mounting means of the wheel to effect selective positioning of the type dies of the wheel. This unit, in the form shown, moves across the work for letter-feed as on parallel tracks or guides, one of which is indicated at 122 in Figs. 8 and 10. Grooved rollers, such as 127, are supported on upper front and rear portions of the framework 6—7—40, as will be described later; and the rollers ride on the tracks or guides. The uprights 6 and 7 can be flanged, as at 42 and 39, respectively, adjacent the movable base 40 (see Fig. 3), and attached to said base as by screws 43 and 41. Hollow frames 8 and 18, Figs. 2 and 6 (for "rotary" selector stop apparatus) are shown as attached to the outer surfaces of the uprights 7 and 6, respectively, as by bolts 9, 10, 19 and 20, and cooperating nuts 11, 12, 21 and 22. The mounting means of the type wheel includes a tube 46 and shaft 45, slidable therein (Fig. 5), which swing between the uprights 6 and 7, as on a trunnion 47—50 (Fig. 3), supported by the uprights; and rotary selection of type dies on the wheel for presentation to the work is governed by settings of the stops of the apparatus supported in the frames 8 and 18, as the mounting means swing with the type wheel toward the work. The work (e. g. paper or other material to be impressed or imprinted) may be carried on a platen roll 100 (Figs. 5 and 7) adjusted as will be described below. The set of rotary selector stops is in two parts, one part operating on a portion of the mounting means of the wheel to turn the wheel clockwise from a normal position and the other part operating similarly to turn the wheel counterclockwise.

In Fig. 2 (cf. Fig. 4) a plurality of electromagnets 13, 14, 15 and 16 are secured, as by screws 17, in the frame 8. These magnets actuate horizontally disposed motion-multiplying levers 28, 29, 30 and 31 on the magnet frames, which are connected respectively to sliding stop pins 128, 129, 130 and 131 (see Fig. 6) mounted in parallel guide brackets 36 on a plate 37 secured to the upright 7. The stop pins are normally urged downwardly, as by springs as indicated in Fig. 6. The broken lines on Fig. 6 illustrate active positions of the stop pins. The levers 28—31 are appropriately connected to the pins 128—131, respectively, so as individually to raise the stop pins when the respective magnets are energized.

The above described magnet, lever and stop pin arrangement is duplicated on the upright 6 and frame 18. Fig. 2 shows the magnets numbered seriatim 23 to 26, secured as by screws 27, levers 32 to 35, stop pins 132 to 135 and support 38 for carrying the stop pins guiding sleeves 36. The stop pins 128—131 and 132—135 can be projected upwardly slightly beyond the upper arcuate margins of the respective uprights 7 and 6 by the electro-magnets; but only one stop is so projected at any one time. The manner in which the wheel 44 is turned by the stop pins is described below.

Referring to Figs. 3 and 5 (further relative to the mounting means for the type wheel) the tube 46, shaft 45 and trunnion mounting 47—50 can be arranged as follows: The tube 46 has aligned bosses 47 shouldered adjacent the respective uprights 6 and 7 and having reduced extensions 48 and 49 projecting respectively into and through respective uprights at appropriate bearing openings in the latter. The extension 49 protrudes beyond the upright 6 sufficiently to enable mounting thereon a toothed wheel 50 (pinned to 47 at 51) for oscillating the tube about the trunnion axis.

For oscillating the tube 46, the shaft 45 and the type wheel carried by the latter from the normal position of rest (see broken line illustration of the wheel and mounting means (Fig. 5) toward the work striking position of the wheel (shown in full lines, Fig. 5) a lever 62 (Fig. 4) can have teeth meshing with the gear wheel 50 and the lever can be mounted as on a pivot 63 on the uprights 6 and 7, so that swinging of the lever oscillates the type wheel through the intermediary of its mounting means. The lever may be moved clockwise, as shown in Fig. 4, against a fixed stop by a spring 64, and the type wheel thereby retained normally in the position of rest. An "impact" magnet 158, supported, for instance, on the base 40 of the transcribing unit frame, operates the lever 62 in a counter-clockwise direction, as by having an armature 115 connected to the forward arm of the lever 62 by a link 61. Fig. 8 shows the armature hinged at 116 to an upstanding bracket 113 on the magnet assembly.

The lower end of the shaft 45 slides but cannot rotate in the tube 46; but the upper end of the shaft can slide, as well as rotate in the tube. The necessary coupling swivel to enable the movements and limitations just mentioned, in respect to the shaft 45, is not illustrated. The lower portion of the shaft is maintained against rotation by oppositely projecting arms 66 rigid with the lower shaft section and extending through aligned slots in the tube 46 in the region of the trunnion axis. Means to hold the lower shaft and hence the type wheel in a normal position, vertically, may comprise balanced springs 67 and 68 attached to the arms 66 and to the tube 46 or an extension of it, as in the case of the spring 68. The axis of the arms 66 in the normal position of the tube pass through the trunnion axis of the tube.

At the upper end of the tube 46 the latter fixedly carries a member 70 in the form of a yoke; and between the arms of the yoke (latter constituted in part by the upper end of the tube) is a freely swingable collar splined to the rotatable portion of the shaft 45 and having rearwardly diverging symmetrical arms 65 normally held, as by a tension spring 69 attached to the yoke and collar, so that the arms pass over respective rows of stop pins 128—131 and 132—135 in the inactive or "non-set" positions of the pins, but so that one arm or the other will be engaged by an upwardly projected or "set" pin during rearward travel of the mounting means of the type wheel. The type wheel rotates with the upper shaft section. Thus, if one of the magnets 13 to 16 is energized during rearward swinging of the type wheel, the latter will be turned counterclockwise (Fig. 2) through an angle determined by the position of the engaged stop 128—131 in reference to the swinging movement of the yoke 70 and armed collar. Similarly, if one of the stops 132—135 is "set" by its magnet the type wheel will be turned clockwise as the mounting means of the type wheel moves rearwardly. Fig. 2 shows (at the left and in broken lines) the position of rest of the armed collar and at the right (in full lines) the position of the armed collar if no stop has been projected upwardly during the rearward swinging movement of the mounting means of the wheel. Generally radiating indications, in broken lines, of one of the arms 65 are to show the manner in which the various stops 132 to 135, if raised by their respective magnets, accomplish turning or indexing of the type wheel through the supporting shaft thereof to select which of the vertical rows of type will be presented to the work at the final swung position of the type wheel against the work. Thus, assuming the proper character die of the row has been selectively positioned, the desired character of the row will effect an impression on the work.

"Vertical" selection of type dies on the wheel in cooperation with the "rotary" selection can be accomplished, as will now be described.

The inertia to be overcome incident to vertical selection of characters from the positioned vertical rows of type dies and the inertia incident to turning the type wheel can be reduced substantially to a minimum by increasing the number of dies in each vertical row and correspondingly decreasing the number of dies in each horizontal row (relative to the number usually provided) and by dividing the vertical selection work between vertical shifting of the wheel and vertical shifting of the work support.

In carrying out the ideas above expressed, we can provide, for instance, five horizontal rows of character dies for each of two shifted positions of the work, making ten horizontal row of dies. This reduces the number of dies in the vertical rows, required for more than a complete font and with upper and lower case letters, to a total of 9. Such can be arranged on a very small cylinder having correspondingly low inertia resistance to turning for rotary selection. The wheel can, of course, be a partial instead of a complete cylinder and arranged for easy placement and replacement in proper position on the shaft 45.

The vertical adjustment of the wheel provided by the arrangement according to Fig. 3, enables selection of five rows of characters using four stops cooperating with the arms 66 on the sliding portion of the shaft 45. This is doubled by provision for vertical shifting of the work. There are two horizontal rows (one for each vertically shifted position of the work) which require no adjustment of the wheel as the same swings to printing position. Thus, the vertical selector stops, indicated at 56, 57, 58, and 59 on Figs. 3 and 5, are not positioned to cooperate with either arm 66 for two horizontal rows on the type wheel. Such groups of character dies, both horizontally and vertically, will be regarded for convenience as "neutral" rows.

For illustration only, the upper case or capital characters may comprise the upper five horizontal rows, while the lower case or small letters comprise the lower five rows. The platen 100 is shown in raised position, and as though being struck by one of the upper case character dies of the "neutral" horizontal row. The "neutral" horizontal row of lower case characters is the third row from the bottom of the wheel font.

Positioning means for the stops 56—59 are located on the upright frame member 7, as shown in Fig. 3. The stops are pins or rods which slide from inactive positions, shown in full lines, to active positions through guiding openings in the upright 7. Receiving sockets on the opposite upright (6) may receive the free ends of the pins to reduce likelihood of bending of the pins upon impact with the arms 66. The magnets 52, 53, 54, and 55 (see Fig. 6) have armatures in the form of levers connected to respective stop pins 57, 58, 56 and 59, and the arrangement is such that the pins are projected between the uprights, into the path of swinging movement of the arms 66, upon energization of the respective magnets.

The position of the arms 66, when the mounting means of the type wheel are at rest, is indicated in broken lines, one arm being above the pins 56 and 59 and the other below the pins 57 and 58. Upon movement of the mounting from rest position, if one of the stops 56 and 59 is projected into the path of an arm 66, the type wheel, through its supporting shaft and engagement of the adjacent arm with the positioned stop pin, will be raised, the pin which is more remote from the trunnion axis raising the wheel the greater amount. Projection of the stop pins 57 and 58 result, obviously, in lowering the type wheel respective distances. The raising and lowering movements are resisted by the springs 68 and 67 respectively; and, after the typing takes place, and the temporarily active magnet is deenergized, the set pin is withdrawn as by one of a set of suitable springs (not shown). The arms 66 are then returned to normal position by reequalization in stress of the springs 67 and 68.

The selective positioning of the platen 100 can be accomplished by energization and deenergization of an electromagnet 112 (Fig. 7), which, upon being energized, swings a lever 71 about a pivot 73 in a direction to raise the platen 100 from the full line illustrated position, representing that used for typing from character dies on the lower five rows of the type wheel, to the position illustrated in broken lines (latter being the position of the platen shown in Fig. 5). The lever 71 would have two arms for supporting the platen, and these arms are normally held as by gravity against stops, one of which is shown at 72, Fig. 7. The platen positioning means is controlled by a "shift" key S on the keyboard (shift key shown only on Fig. 9); and the magnet 112 is in a special circuit which is unaffected by the character selecting keys of the keyboard. The magnet 158 is energized by actuation of all the character selecting keys.

Referring to Figs. 8 and 10, these illustrate a suitable means for advancing the carriage which supports the type wheel and its mounting means above described along the rails 122 for letter feed and for returning the carriage to proper position to begin typing a new line. Line feeding of the work can be accomplished by turning the work supporting platen, as by means of handles suggested at the right and left of the case 2 on Fig. 1, or in some other suitable way, as electrically. The base member 40 has upward extensions 114 (one shown) carrying the supporting rollers 127 which engages the track. The underside of one of the bars 122 constitutes a toothed rack 105, which remains constantly in mesh with a pinion 119 having a shaft 109 journalled in the extension 114 of the base 40. One end of the shaft 109 carries a ratchet wheel 110 having an operating pawl 137 connected (as by a pin 117 passing through a slot 118 in the adjacent upright 114 of the base 40) with the armature 115 of the magnet 158. A retaining pawl is shown at 120 in engagement with a tooth of the ratchet wheel. The pawls 120 and 137 have springs 121 and 128, respectively, to urge the pawls toward the ratchet wheel. The wheel is turned one tooth each time the magnet armature 115 is depressed and elevated to perform a typing operation cycle, such as previously described, thus advancing the transcribing unit one letter space. The pawl 137 operates the ratchet wheel and its pinion to advance the carriage to the right, as shown in Fig. 8, thus advancing the unit from left to right across the work in the manner to effect typing conventionally in a horizontal line. The advancing is yieldingly resisted by a spiral or other spring in a casing 123 attached to the carriage, as by a cable 108. At the end of the typed line the pawls are released by appropriate means; and the spring then returns the carriage to initial position wherein shock may be absorbed by a buffer 124 diagrammatically shown as a dashpot, the plunger of which engages one of the carriage wheels 127.

Referring now to the electrical diagram Fig. 9, a main switch 100 controls the entire circuit to energize it as from a power source 101. Each of the character keys of the keyboard (see A, B, C, etc.) constitutes a switch in respective group portions of the circuit, one group for each of the vertical selection magnets 52, 53, 54 and 55 and one for the "neutral" position in respect to vertical selection. The group of character keys of the neutral vertical selection group is connected to a resistance element 91 corresponding to the resistance offered by the several magnets 52, etc. Similar resistance 90 replaces magnets 13—16, 23—26 in that portion of the circuit which is energized when no rotary adjustment of the type wheel is required ("neutral" as to rotary selection).

Depression of the character key A causes current to pass through resistance 90, impact magnet 58 and resistance 91. Character A being in both "neutral" rows the depression of key A causes only the operation of swinging of the "A" type die against the work by energization of the impact magnet. Closure of the circuit which includes the keyboard switch B causes energization of the magnet 26 and the impact magnet 58, effecting a rotary selection movement of the type wheel, but no vertical selection.

The keyboard switch C is in a group connected to the magnet 52, hence vertical selection is accomplished (type wheel lowered one row by interposition of stop 57 in the path of movement of the adjacent arm 66); but, since switch C is in the circuit portion which includes the resistance 90, depression of said key causes no rotary selection. Other keys of the keyboard cause both vertical and rotary selection, as will be obvious from inspection of the diagram. Depression of the shift key S effects only movement of the platen to change from one case to another.

Solenoids in place of any of the electromagnets shown are considered operative equivalents of electro-magnets of the types illustrated; and other power means for accomplishing relative movement of the type wheel and work for impact and consequent mechanical selective movement of the type wheel vertically and/or rotatively can be used.

Time delay apparatus may be provided in the electrical apparatus so that the coils of the two sets of electro-magnetically positioned stops will be charged before the impact magnet functions. Various devices are well known in the electrical art which can be employed for the purpose.

The series energization of the two sets of selector magnets 13, etc. and 52, etc., results in an unusually simple wiring arrangement which lends itself to economical inter-connection between a control set of switches or conductors and the electrical elements of the typewriting mechanism per se. This is particularly important from the viewpoint of adaptation for long distance operation, master control strip operation, multiplication of machines controllable with one set of control switches (e. g. keyboard keys), etc.

The terms: vertical, horizontal, front, rear, up, down, etc. in the specification are employed for convenience only and not with intent to limit the scope of this instrument.

What we claim is:

1. A typewriting machine of the type-wheel class, which machine has a type wheel, wherein selective positioning of characters by the wheel with reference to the work to be typed is predetermined by presetting of selectors, and wherein power means extraneous to the power required to set the selectors causes the work and positioned characters to be brought together; characterized by the provision of mechanism drivingly connected to the wheel and brought by the motion imparted by said power means into engagement with set selectors in a manner to move the wheel the proper distance to position characters for typing.

2. A machine according to claim 1, wherein the type wheel is rotatably movable, and the mechanism drivingly connected with the type wheel is arranged to cooperate with set selectors to cause rotational character-positioning movement of the wheel.

3. A machine according to claim 1, wherein the type wheel is axially movable and the mechanism drivingly connected to the type wheel is arranged to cooperate with set selectors to cause axial character-positioning movement of the wheel.

4. A machine according to claim 1, wherein there are two sets of selectors, and simultaneously positioned selectors of the two sets cooperate with respective mechanisms connected to the wheel to cause, respectively, axial and rotational character-positioning movements of the wheel.

5. A typewriting machine of the axially and rotatably movable type wheel class, having a keyboard, wherein electro-magnetically operated means, energized upon operation of the several keys, moves the wheel to typing position against the work, characterized in that positioning of the wheel for type selection is accomplished by selector members operated in response to depression of respective keys of the keyboard, and further characterized by cooperable mechanism, which latter is generally movable with the wheel and brought into cooperative relationship with respective selector members for actuation thereby during movement of the wheel toward the work.

6. In a typewriting mechanism, a turnable and axially shiftable type font head, mounting means for the head and means supporting the same and constraining the mounting means for bodily movement transversely of the turning axis of the head toward and away from work supported as on a platen, power means for moving the mounting means bodily to effect engagement of type with the work, individually settable selector members, means connected with the mounting means and actuated by a selected one of the settable members for turning the head to select a character, said head turning means operating in response to movement of the mounting means toward typing position by the power means, and other means on the mounting means and actuated by another selected settable member to cause axial movement of the head for further character selection, said other means operating in response to movement of the head by the power means toward typing position.

7. In a typewriting mechanism, a keyboard with individually settable keys, a turnable and axially shiftable type font head, mounting means for the head and means supporting the same and constraining the mounting means for bodily movement transversely of the turning axis of the head toward and away from work supported as on a platen, power means for moving the mounting means to effect engagement of type with the work, means whereby said power means is rendered operative upon actuation of the several keys, individually settable selector members and means whereby said selector members are operatively positioned by respective keys of the keyboard, means connected with the mounting means and so constructed and arranged as to be actuated by a selected one of the settable members for turning the head to select a character, said head turning means operating in response to movement of the mounting means toward typing position, and other means on the mounting means and so constructed and arranged as to be actuated by another selected settable member operatively positioned by the same key to cause axial movement of the head for further character selection, said other means operating in response to movement of the head toward typing position.

8. In a typewriting mechanism, a turnable and axially shiftable type font head, mounting means for the head and means supporting the same and constraining the mounting means for bodily movement transversely of the turning axis of the head toward and away from work supported as on a platen, power means for moving the mounting means to effect engagement of type with the work, two sets of selectively settable selector members adapted to be individually positioned, means connected with the mounting means and actuated mechanically by positioned ones of the selector members of one set for turning the head to select characters, said means operating in response to movement of the mounting means toward typing position, and other means on the mounting means and actuated by positioned ones of the other set of selector members to cause axial movement of the head for further character selection.

9. In a typewriting mechanism, a turnable and axially shiftable type font head, mounting means for the head and means supporting the same and constraining the mounting means for bodily movement transversely of the turning axis of the head toward and away from work supported as on a platen, electro-magnetic means for moving the mounting means to effect engagement of type with the work, a keyboard, electro-magnetically settable members and cooperating switch means whereby the same are actuatable electrically by keys of the keyboard, means connected with the mounting means and constructed and arranged to be actuated mechanically by respective positioned ones of the settable members for turning the head to select characters, said last-mentioned means operating in response to movement of the mounting means toward typing position, and other means on the mounting means and actuated mechanically by other positioned settable members to cause axial movement of the head for further character selections in response to movement of the mounting means toward typing position.

10. In a typewriter, a reciprocatingly settable multiple type bar, a guide and a shaft slidable in the guide and carrying the type bar, a pivotal mounting for the guide, means to move the guide about the pivotal axis of the mounting to effect typing by means of the type bar, a pair of rigid arms extending in opposite directions from the shaft adjacent the axis of the pivotal mounting, and selectors in fixed positions and acting on respective arms to cause sliding movement of the shaft with respect to the guide as the guide swings about said axis for axially moving the bar different distances in opposite directions for selection.

11. In a typewriter, a rotatably settable type wheel having a set of character dies thereon, a movable mounting carrying the type wheel, power means constructed and arranged to move the mounting toward the work to effect typing by means of the type wheel, electrically operable selectors in fixed positions on opposite sides of the plane of movement of the mounting, an electrical circuit and set of switches connected electrically in the circuit with the selectors to set them, and means drivingly rigid with the type wheel and engageable mechanically with set selectors on respective sides of said plane to index the wheel in directions determined by which side of said plane is occupied by a set selector, and during movement of the mounting toward the work by the power means.

12. In a typewriter, a rotatably and axially settable type wheel having characters in vertical and horizontal rows thereon, a guide and a shaft slidable in the guide and carrying the type wheel, a pivotal mounting for the guide, means to move the guide about the pivotal axis of the mounting to effect typing by means of the type wheel, selectors in fixed position, means drivingly rigid with the type wheel and engageable with a set selector to index the wheel to select characters in individual horizontal rows, a pair of rigid arms extending in opposite directions from the shaft generally adjacent the pivotal axis, and other selectors in fixed respective positions and acting on respective arms to cause sliding movement of the shaft with respect to the guide as the guide swings about the pivotal axis for axially moving the wheel different distances for selection of characters in the different vertical rows.

13. In a typewriting mechanism, a turnable type wheel, a reciprocating support for the wheel adapted and arranged for moving the wheel transversely of its turning axis toward and away from the work, a V-shaped member drivingly rigid with the wheel and movable therewith, and two rows of stops, one on each side of the path of movement of the V-shaped member and adapted to be selectively positioned in the paths of movement of respective arms of the V to adjust the wheel through different angles at a predetermined position of the wheel adjacent or against the work.

14. In a typewriting mechanism of the type wheel class, a font element having horizontal rows of dies, a shaft on which the font element is supported, a longitudinal guide for the shaft pivoted on an axis remotely of the font element, means projecting from the shaft normal to the pivot axis of the guide and in the region of the pivot axis, selector stops positioned adjacent the path of movement of said means and selectively movable into and out of said path, and means for swinging the guide on its pivot whereby to move the first-named means into contact with a stop positioned in said path to position a predetermined horizontal row of dies for printing.

15. In a typewriter machine of the type wheel class having a type wheel with vertical and horizontal rows of type thereon and wherein two sets of electro-magnets become operative to initiate vertical and rotary selection of character dies from the vertical and horizontal rows of character dies respectively, electrical circuits for the electro-magnets and control switches therein; characterized in that various ones of the magnets of one set are placed in series with respective magnets of the other set upon actuation of the switches, whereby the number of conductors leading from the magnets to the switches is comparatively small.

16. In a typewriting machine, an axially and rotatably movable type wheel, means to support the wheel and means to support work for typing, one of said means being movable to enable the wheel and work to be brought together to effect typing operations on the work, power mechanism adapted and arranged to act on the movable support to move the wheel and work relatively toward each other to effect typing, two sets of electromagnetically operable selector members, mechanism connected with the wheel and cooperable with positioned selector members of one set during said movement in a manner to turn the wheel different distances during said relative movement of the wheel and work, mechanism connected with the wheel and constructed and arranged to move the wheel axially different distances and cooperable, during said relative movement, with positioned selector members of the other set, respective electromagnets of the two sets being electrically connected in series, and a set of control switches adapted to close the respective circuits for simultaneous adjustment of the selector members of the two sets.

FRANK D. SLOUGH.
CAPEL W. McNASH.